United States Patent
Arai

(10) Patent No.: US 9,609,207 B2
(45) Date of Patent: Mar. 28, 2017

(54) COLOR PROCESSING APPARATUS AND METHOD THEREFOR

(71) Applicant: CANON KABUSHIKI KAISHA, Tokyo (JP)

(72) Inventor: Kimitaka Arai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 14/624,902

(22) Filed: Feb. 18, 2015

(65) Prior Publication Data

US 2015/0254876 A1     Sep. 10, 2015

(30) Foreign Application Priority Data

Mar. 7, 2014   (JP) ................. 2014-045562

(51) Int. Cl.
| | |
|---|---|
| H04N 9/73 | (2006.01) |
| G06K 9/00 | (2006.01) |
| H04N 5/232 | (2006.01) |
| H04N 1/60 | (2006.01) |

(52) U.S. Cl.
CPC ....... *H04N 5/23222* (2013.01); *H04N 1/6052* (2013.01); *H04N 1/6055* (2013.01); *H04N 1/6086* (2013.01); *H04N 5/23293* (2013.01)

(58) Field of Classification Search
CPC .......... G06T 7/408; G06T 2207/10024; H04N 5/23293; H04N 5/2354; H04N 1/6086; H04N 5/23229; H04N 9/735; H04N 17/002; H04N 9/045; H04N 2201/0084; H04N 5/23212; H04N 1/00; G06K 9/00234; G06K 9/00221

See application file for complete search history.

(56) References Cited

U.S. PATENT DOCUMENTS

| | | | |
|---|---|---|---|
| 7,116,338 B2 | 10/2006 | Fukao et al. | |
| 7,623,138 B2 | 11/2009 | Fukao et al. | |
| 8,466,993 B2 | 6/2013 | Arai | |
| 2003/0234772 A1* | 12/2003 | Zhang | G06F 17/30843 345/177 |
| 2007/0091334 A1* | 4/2007 | Yamaguchi | H04N 9/3182 358/1.9 |
| 2007/0177032 A1* | 8/2007 | Wong | H04N 9/69 348/223.1 |

(Continued)

FOREIGN PATENT DOCUMENTS

JP          2006-118991 A     5/2006

*Primary Examiner* — Trung Diep
(74) *Attorney, Agent, or Firm* — Fitzpatrick Cella Harper & Scinto

(57) ABSTRACT

Capturing conditions and capturing of an imaging apparatus, which captures a plurality of color patches displayed on a monitor, are controlled. Imaging data is inputted from the imaging apparatus. Measurement values of the plurality of color patches are calculated from the imaging data using color conversion characteristics corresponding to the capturing conditions. First capturing conditions used at start of the capturing for the calculation of measurement values based on the imaging data captured by the imaging apparatus using initial capturing conditions. After the capturing for the calculation of measurement values is started, when the imaging data is input, it is determined whether or not perform the capturing by changing the capturing conditions.

9 Claims, 13 Drawing Sheets

(56) References Cited

U.S. PATENT DOCUMENTS

| | | | |
|---|---|---|---|
| 2009/0202235 A1* | 8/2009 | Li | .................... H04N 5/23212 396/125 |
| 2013/0307866 A1 | 11/2013 | Arai | |
| 2014/0168253 A1 | 6/2014 | Arai et al. | |

* cited by examiner

F I G. 6

| PATCH NUMBER | R | G | B |
|---|---|---|---|
| 1 | XXX | XXX | XXX |
| 2 | XXX | XXX | XXX |
| 3 | XXX | XXX | XXX |
| 4 | XXX | XXX | XXX |
| 5 | XXX | XXX | XXX |
| ⋮ | ⋮ | ⋮ | ⋮ |

FIG. 7

| CAMERA MODEL | F-NUMBER | ISO | SHUTTER SPEED | MATRIX COEFFICIENT |
|---|---|---|---|---|
| A | xxx | xxx | xxx | xxx, xxx, xxx, xxx, xxx, xxx, xxx, xxx, xxx |
|  | xxx | xxx | xxx | xxx, xxx, xxx, xxx, xxx, xxx, xxx, xxx, xxx |
|  | xxx | xxx | xxx | xxx, xxx, xxx, xxx, xxx, xxx, xxx, xxx, xxx |
|  | ... | ... | ... | ... |
| B | xxx | xxx | xxx | xxx, xxx, xxx, xxx, xxx, xxx, xxx, xxx, xxx |
|  | xxx | xxx | xxx | xxx, xxx, xxx, xxx, xxx, xxx, xxx, xxx, xxx |
|  | xxx | xxx | xxx | ... |
| C | xxx | xxx | xxx | xxx, xxx, xxx, xxx, xxx, xxx, xxx, xxx, xxx |
|  | xxx | xxx | xxx | xxx, xxx, xxx, xxx, xxx, xxx, xxx, xxx, xxx |
|  | ... | ... | ... | ... |
| ... | ... | ... | ... | ... |

F I G. 12

| IMAGE NUMBER j | PATCH NUMBER i | CLASSIFICATION $C(P_i)$ | X | Y | Z |
|---|---|---|---|---|---|
| 0 | 1 | 1 | XXX | XXX | XXX |
|   | 2 | 2 | XXX | XXX | XXX |
|   | 3 | 3 | XXX | XXX | XXX |
|   | ⋮ | ⋮ | ⋮ | ⋮ | ⋮ |
| 1 | 1 | 4 | – | – | – |
|   | 2 | 1 | XXX | XXX | XXX |
|   | 3 | 2 | XXX | XXX | XXX |
|   | ⋮ | ⋮ | ⋮ | ⋮ | ⋮ |
| 2 | 1 | 4 | – | – | – |
|   | 2 | 4 | – | – | – |
|   | 3 | 4 | – | – | – |
|   | ⋮ | ⋮ | ⋮ | ⋮ | ⋮ |
| ⋮ | ⋮ | ⋮ | ⋮ | ⋮ | ⋮ |
| jmax | ⋮ | ⋮ | ⋮ | ⋮ | ⋮ |

COLOR PROCESSING APPARATUS AND METHOD THEREFOR

BACKGROUND OF THE INVENTION

Field of the Invention

The present invention relates to image processing of acquiring measurement values of color patches using an imaging apparatus.

Description of the Related Art

A display screen is measured using a spectral radiancemeter. It is possible to measure only one point on the screen by measurement using the spectral radiancemeter. If a number of color patches displayed on the screen are measured, it is necessary to perform the measurement by the number of colors. This requires much labor and time, thereby imposing a heavy load on the user who performs measurement. In recent years, a simple method of measuring a display screen using a digital camera capable of two-dimensionally acquiring measurement values may be adopted.

On the other hand, as for displays, displays having a high contrast ratio, such as a liquid crystal display (LCD) having a light emitting diode (LED) back light and an organic electroluminescence display (OLED), have made their debut. When a digital camera is used to measure such display screen, the dynamic range of the display may exceed that of the digital camera to cause highlight-detail losses and shadow-detail losses, resulting in difficulty in measurement within a range exceeding the dynamic range of the digital camera.

Japanese Patent Laid-Open No. 2006-118991 discloses a method of measuring a display screen using a digital camera by avoiding highlight-detail losses and shadow-detail losses. This method changes a capturing condition (shutter speed or f-number) according to the brightness of the screen so that pixel values after image capturing fall within a desired range (from 50 to 200 in 8 bits). The pixel values are then converted into luminance values by an approximation based on the capturing condition and constants depending on the digital camera.

However, under different capturing conditions, processes for optical black pixels in the digital camera and parameters for noise removal and the like are different. Using only a simple gain calculation or one approximation cannot obtain accurate luminance values from the pixel values of the digital camera.

Furthermore, since the pixel value and the luminance value have no complete linear relationship, the relationship between the pixel value and the luminance value may be discontinuous between data obtained under different capturing conditions to cause reversal of tonality, thereby disabling obtaining of an accurate measurement value (luminance value).

SUMMARY OF THE INVENTION

In one aspect, a color processing apparatus comprising: a control unit configured to control capturing conditions and capturing of an imaging apparatus which captures a plurality of color patches displayed on a monitor; an input unit configured to input imaging data from the imaging apparatus; and a calculation unit configured to calculate measurement values of the plurality of color patches from the imaging data using color conversion characteristics corresponding to the capturing conditions, wherein the control unit sets first capturing conditions used at start of the capturing for the calculation of measurement values based on the imaging data captured by the imaging apparatus using initial capturing conditions, and after the capturing for the calculation of measurement values is started, when the imaging data is input, the control unit determines whether or not perform the capturing by changing the capturing conditions.

According to the aspect, it is possible to accurately obtain a measurement value of a color patch in measurement of the color patch exceeding the dynamic range of an imaging apparatus.

Further features of the present invention will become apparent from the following description of exemplary embodiments with reference to the attached drawings.

BRIEF DESCRIPTION OF THE DRAWINGS

FIG. 6 is a table showing an example of the format of measurement patch information.

FIG. 7 is a table showing examples of color conversion characteristics stored in a color conversion characteristic storage unit.

FIG. 12 is a table showing an example of a measurement value storage table.

DESCRIPTION OF THE EMBODIMENTS

Image processing according to each embodiment of the present invention will be described in detail below with reference to the accompanying drawings.

First Embodiment

Arrangement of Apparatus

Figure 1:
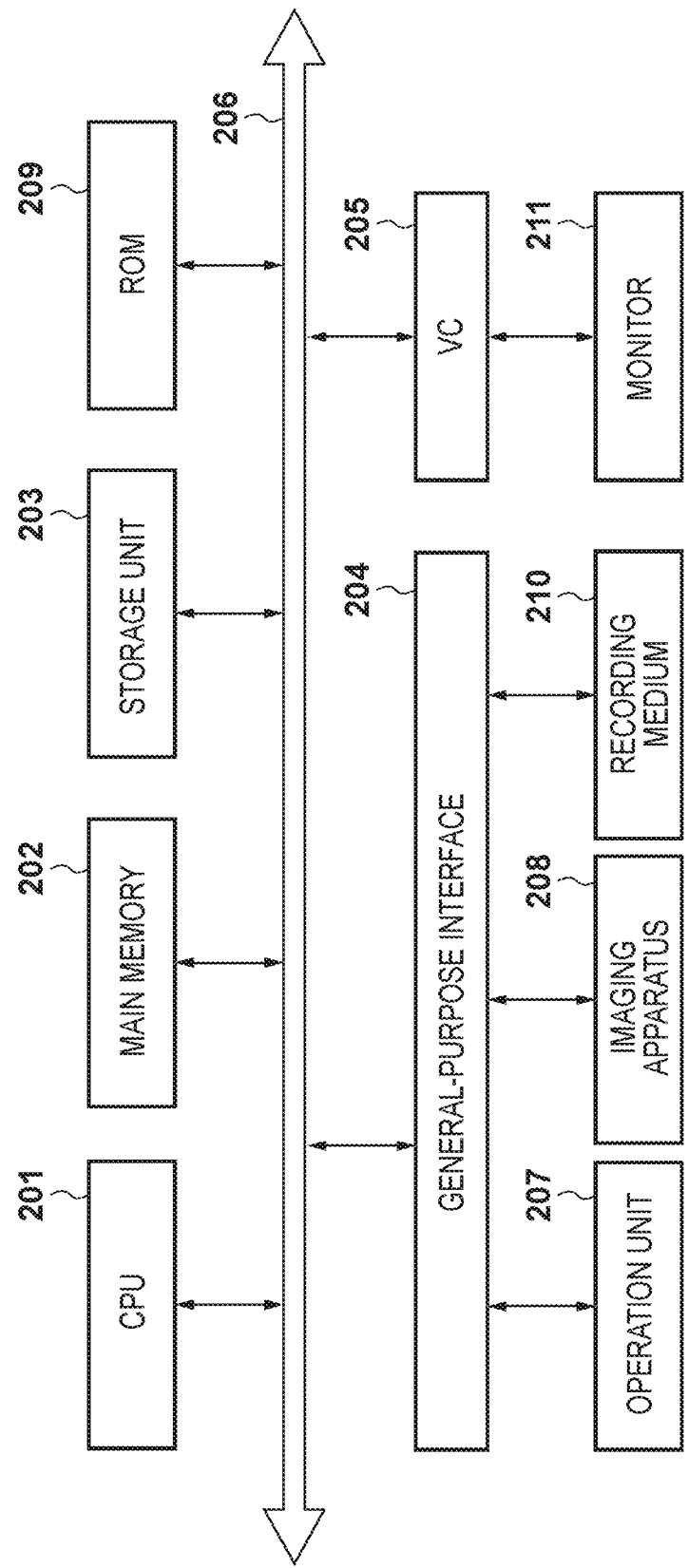
FIG. 1 is a block diagram showing the arrangement of an information processing apparatus which executes color processing according to an embodiment.

FIG. 1 is a block diagram showing the arrangement of an information processing apparatus which executes image processing according to the embodiment.

A microprocessor (CPU) 201 executes an operating system (OS) or program stored in a read only memory (ROM) 209 or a storage unit 203 by using a main memory 202 such as a random access memory (RAM) as a work memory, thereby controlling components (to be described later) through a system bus 206. Note that the storage unit 203 is a hard disk drive (HDD), a solid-state drive (SSD), or the like, and stores various data and a program for implementing color processing (to be described later).

An operation unit 207 such as a keyboard and mouse, an imaging apparatus 208 such as a digital camera, a recording medium 210 such as a memory card or USB memory, and the like are connected to a general-purpose interface (I/F) 204 such as USB (Universal Serial Bus) or IEEE1394. A monitor 211 is connected to a video card (VC) 205. The CPU 201 displays, on the monitor 211, a user interface (UI) and information indicating the progression of processing and the result of processing.

For example, in accordance with a user instruction input through the operation unit 207, the CPU 201 loads, into a predetermined area of the main memory 202, an application program (AP) stored in the storage unit 203 or the recording medium 210. The CPU 201 executes the AP to display a UI on the monitor 211 in accordance with the AP.

Then, in accordance with a user operation of the UI, the CPU 201 inputs various data stored in the storage unit 203 or the recording medium 210 and imaging data from the imaging apparatus 208, and loads them into a predetermined area of the main memory 202. In accordance with the AP, the CPU 201 performs predetermined calculation processing for these various data loaded in the main memory 202. In accordance with a user operation of the UI, the CPU 201 displays the calculation processing result on the monitor 211, or stores it in the storage unit 203 or the recording medium 210.

Note that the CPU 201 can transmit/receive programs, data, and calculation processing results to/from a server apparatus on a wired or wireless network through a network I/F (not shown) connected to the system bus 206. A tablet computer can also be used as an information processing apparatus. In this case, a touch panel overlaid on the screen of the monitor 211 serves as the operation unit 207.

[Arrangement of Processing]

Figure 2:
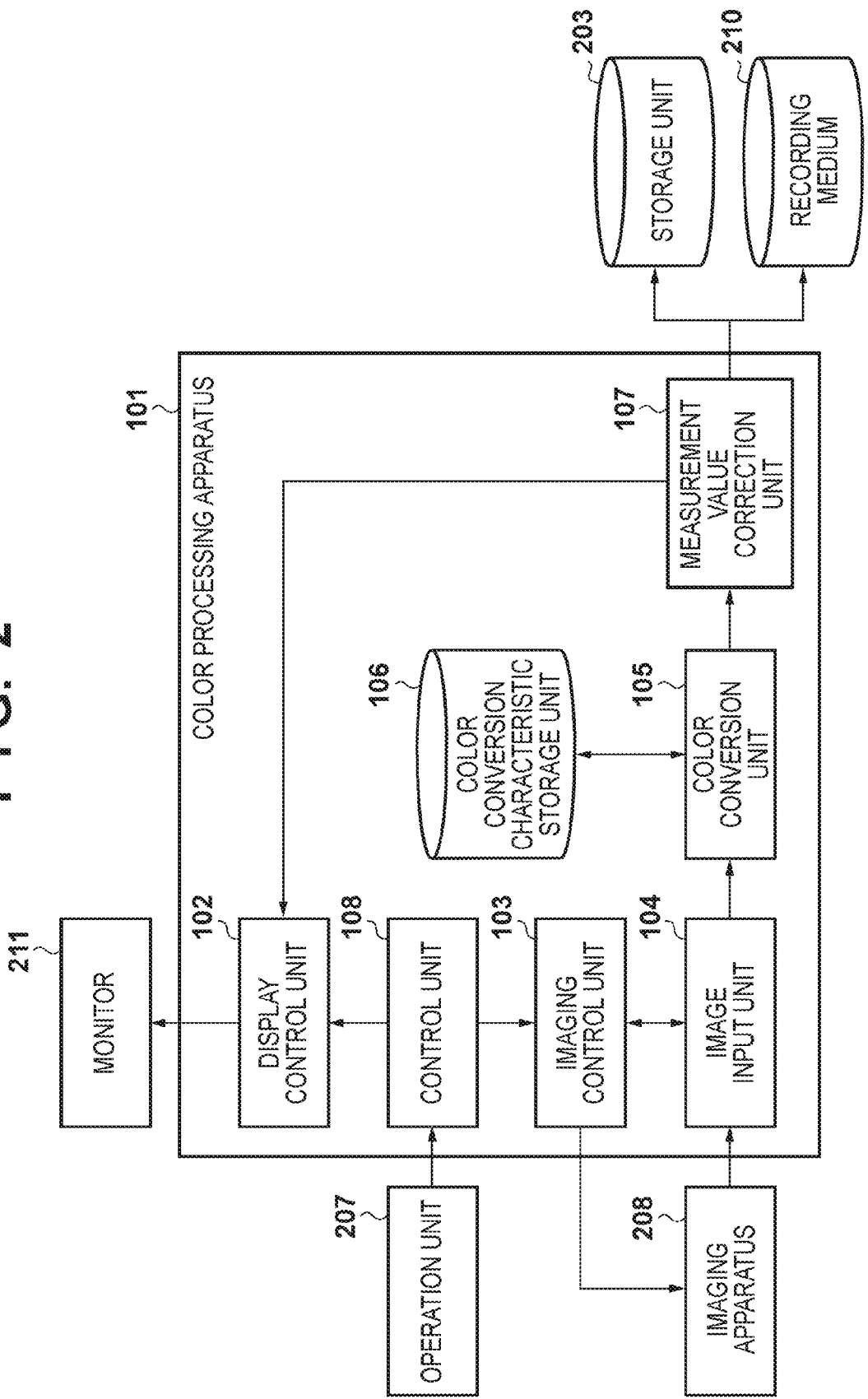
FIG. 2 is a block diagram showing the arrangement of a color processing apparatus.

FIG. 2 is a block diagram showing the arrangement of a color processing apparatus 101. Note that the arrangement shown in FIG. 2 is implemented when the CPU 201 executes the AP. Processing of generating a display profile by the color processing apparatus 101 will be explained below.

Referring to FIG. 2, a control unit 108 inputs a user instruction from the operation unit 207 through the general-purpose I/F 204, and controls each component (to be described later) in accordance with the user instruction.

A display control unit 102 displays a UI and a plurality of color patches (to be referred to as "measurement patches" hereinafter) for measurement on the monitor 211 through the VC 205. Note that a monitor for display of the UI may be different from a monitor for which a display profile is to be generated. In this case, the two monitors are connected to the VC 205, and the UI is displayed on one of the monitors and the measurement patches are displayed on the other monitor. An area around the measurement patches has lowest luminance (black of the monitor).

An imaging control unit 103 controls the imaging apparatus 208 through the general-purpose I/F 204 to set, in the imaging apparatus 208, a capturing condition for capturing the measurement patches displayed on the monitor 211, thereby capturing the measurement patches. An image input unit 104 receives a captured image from the imaging apparatus 208 through the general-purpose I/F 204, and acquires the capturing condition from the imaging control unit 103. Note that the capturing condition may be acquired from the imaging apparatus 208.

A color conversion unit 105 acquires, from a color conversion characteristic storage unit 106, a color conversion characteristic corresponding to the capturing condition acquired by the image input unit 104, and calculates measurement values of the measurement patches from the captured image using the color conversion characteristic. The color conversion characteristic storage unit 106 is allocated to the storage unit 203 or the recording medium 210, and stores in advance a color conversion characteristic specific to each capturing condition of the imaging apparatus 208.

A measurement value correction unit 107 corrects the measurement values calculated by the color conversion unit 105, and supplies the corrected measurement values to the display control unit 102 or generates a display profile based on the corrected measurement values to store it in the storage unit 203 or the recording medium 210. The display control unit 102 displays, on the UI, colors based on the supplied measurement values.

User Interface

Figure 3:
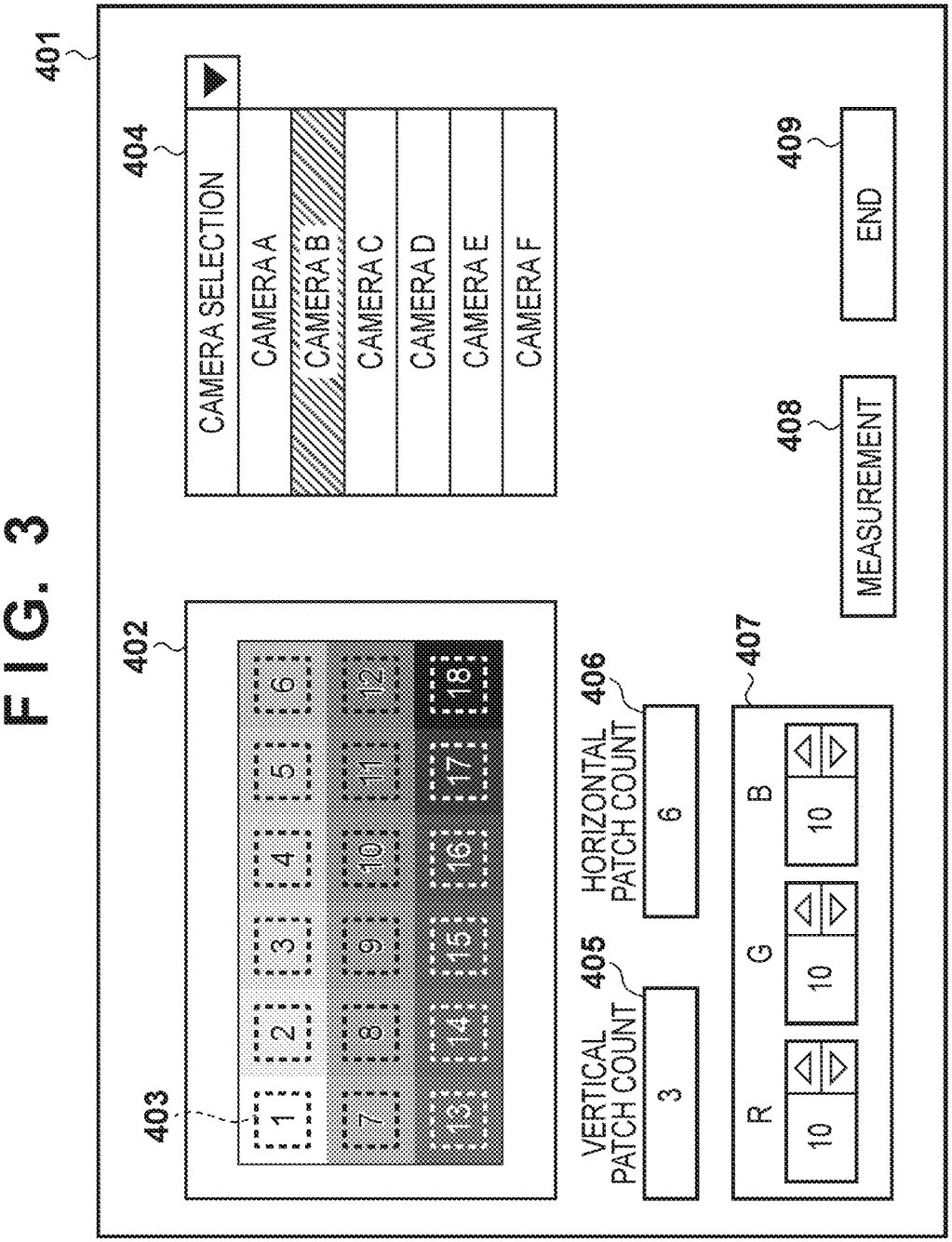
FIG. 3 is a view showing an example of a UI displayed on a monitor by a display control unit.

FIG. 3 shows an example of a UI 401 displayed on the monitor 211 by the display control unit 102.

A window 402 displays measurement patches each indicating a patch number and a measurement target area 403. It is possible to select the model of the imaging apparatus 208 for measurement from a pull-down menu 404. It is also possible to set a measurement patch row count and measurement patch column count using text boxes 405 and 406.

After selecting one measurement patch from the window 402, the RGB values of the patch can be adjusted by operating a pixel value adjustment unit 407, and the position and size of the measurement target area 403 can be adjusted. The patch number corresponds to the ID number of measurement patch information (to be described later). The patch number of the upper left patch is set to "1", and the patch number increases from the upper left patch in the raster order.

Upon completion of selection of the model of the imaging apparatus 208 and setting of the measurement patches, the user instructs to perform measurement by pressing a measurement button 408. To terminate execution of the AP for display profile generation processing, the user presses an end button 409.

Transition of processing according to the operation of the UI will be described with reference to the state transition chart of FIG. 4. Note that an operation expressed as "click" hereinafter corresponds to a "touch" operation for a touch panel.

Figure 4:
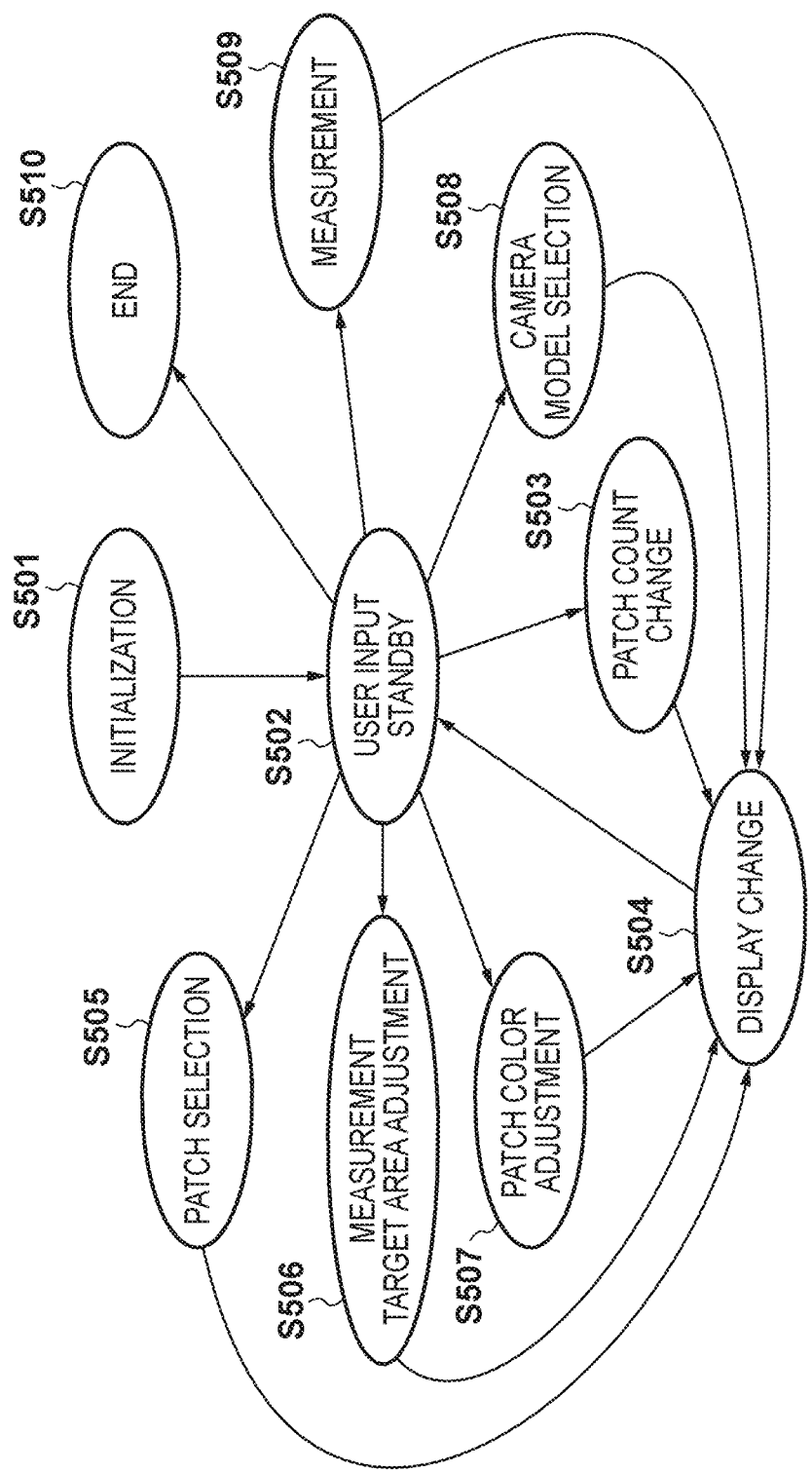
FIG. 4 is a state transition chart for explaining transition of processing according to the operation of the UI.

When the AP for display profile generation processing is executed, initialization (S501) is performed to display the UI shown in FIG. 4, thereby transiting to a user input standby state (S502).

In the user input standby state (S502), when the text box 405 or 406 is operated, the patch count is changed in a patch count change state (S503), and a patch display count in the window 402 is changed in a display change state (S504). After that, the state returns to the user input standby state (S502).

In the user input standby state (S502), when one of the patches in the window 402 is clicked, the patch is selected in a patch selection state (S505), and display of the patches in the window 402 is changed in the display change state (S504). For example, the display is changed by embossing and displaying the selected patch, and the R, G, and B values of the selected patch are displayed in the pixel value adjustment unit 407. After that, the state returns to the user input standby state (S502).

In the patch selected state and the user input standby state (S502), when the display frame of the measurement target area 403 of the selected patch is selected or a handle of the display frame is selected, it becomes possible to move, enlarge, or reduce the display frame in a measurement target area adjustment state (S506). After display of the display frame of the measurement target area 403 is changed in the display change state (S504), the state returns to the user input standby state (S502).

In the patch selected state and the user input standby state (S502), when a spin button of the pixel value adjustment unit 407 is clicked, the R, G, and B values of the selected patch are changed in a patch color adjustment state (S507). After the color of the selected patch is changed in the display change state (S504), the state returns to the user input standby state (S502).

Note that the patch selected state is canceled when another patch is clicked, the display frame of the measurement target area 403 of the selected patch is clicked, or an operation except for an operation of the pixel value adjustment unit 407 is performed.

In the user input standby state (S502), when the pull-down menu 404 is operated, it becomes possible to select a camera model in a camera model selection state (S508). After the selected camera model is displayed in the display frame of the pull-down menu 404 in the display change state (S504), the state returns to the user input standby state (S502).

In the user input standby state (S502), when the measurement button 408 is clicked, for example, the measurement patches are captured, a captured image is acquired, measurement values are calculated, and a display profile is generated in a measurement state (S509). After the patches based on the measurement values are displayed on the monitor 211 in the display change state (S504), the state returns to the user input standby state (S502).

In the user input standby state (S502), when the end button 409 is clicked, the AP for display profile generation processing ends (S510).

Measurement patches to be captured may be measurement patches displayed on another monitor, measurement patches displayed in another area of the monitor which displays the UI, or patches displayed in the window 402. The user arranges the imaging apparatus 208 so that all the measurement patches to be captured have a sufficient size to fall within the range of the viewfinder of the imaging apparatus 208 or the display range of an LCD panel, makes the imaging apparatus 208 focus on a display surface, and then instructs measurement. Note that the user arranges the imaging apparatus 208 so as to include only the measurement patches and their surrounding black in a capturing range.

The patches are displayed based on the measurement values to confirm whether measurement has been successfully performed. It is desirable to display the patches in an area different from that of the UI so as to perform color comparison with the patches in the window 402. Note that the measurement value is a color value such as CIEXYZ values, and the display control unit 102 performs color conversion for the measurement value into device RGB values of the monitor 211 with reference to the display profile of the monitor 211, and outputs the values to the VC 205.

The display profile includes data in a three-dimensional lookup table format indicating correspondence between the RGB values of each measurement patch and the measurement value (for example, CIEXYZ values).

[Color Processing]

Figure 5:
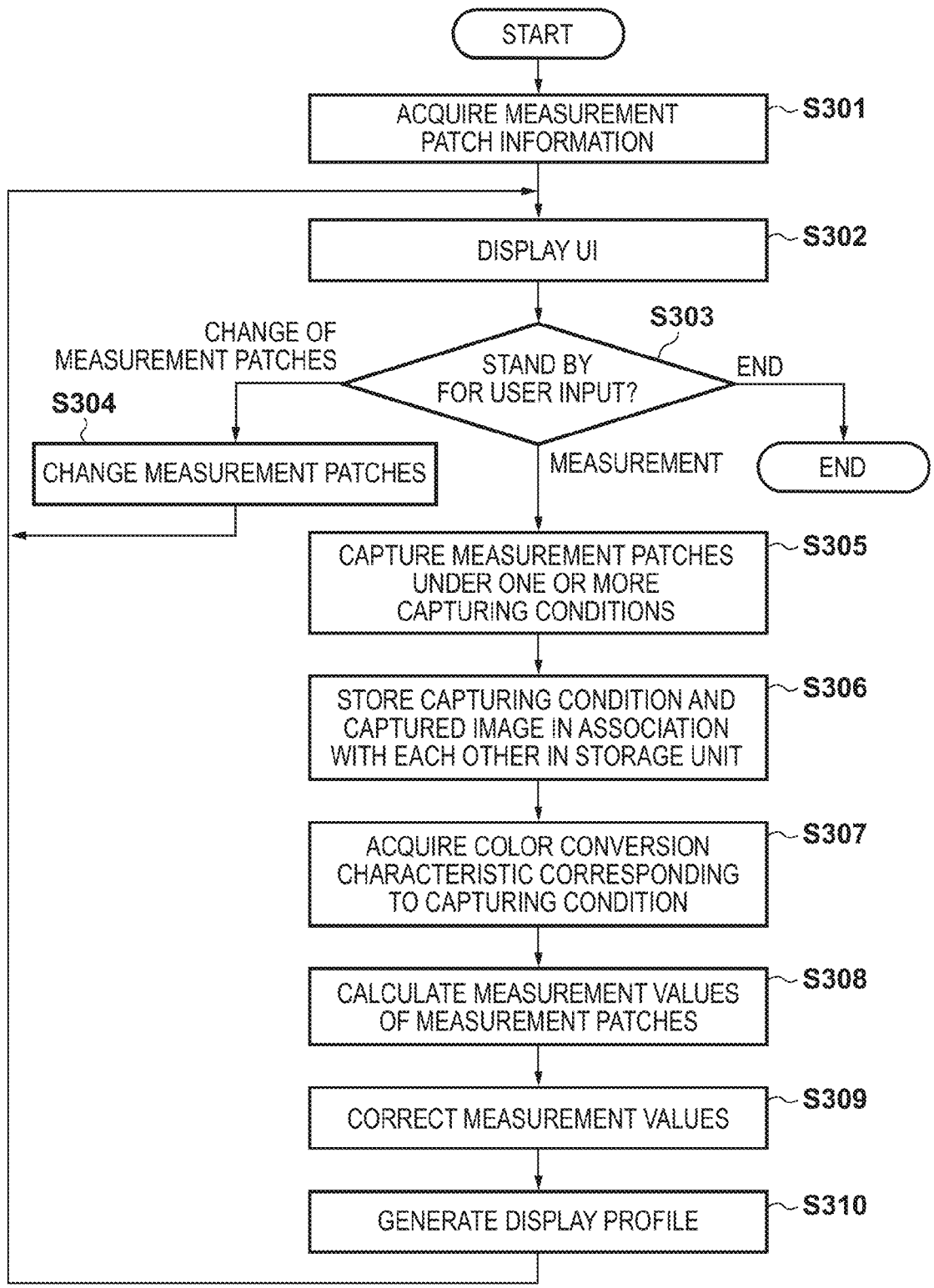
FIG. 5 is a flowchart for explaining an overview of color processing executed by the color processing apparatus.

An overview of color processing executed by the color processing apparatus 101 will be described with reference to the flowchart of FIG. 5. Note that processing shown in FIG. 5 starts upon execution of the AP for display profile generation processing.

The display control unit 102 acquires measurement patch information from the storage unit 203 or the recording medium 210 (S301), and displays the UI on the monitor 211 (S302). Patches indicated by the measurement patch information are displayed in the window 402 of the UI. FIG. 6 shows an example of the format of the measurement patch information. The measurement patch information is a table recording patch numbers and the R, G, and B values of the patches.

The control unit 108 stands by for a user input (S303). When a user input is received, the control unit 108 branches the process in accordance with a user instruction. That is, if the user instruction indicates a change of the measurement patches (a change of the patch count, selection of a patch, adjustment of the measurement target area 403, or adjustment of a patch color), the measurement patches are changed (S304). The control unit 108 then returns the process to step S302 to cause the display control unit 102 to change display of the UI. On the other hand, if the user instruction indicates an end of the process, the control unit 108 terminates the process. Note that the patch count is represented by Np and stored in a predetermined area of the main memory 202.

If the user instruction indicates measurement, the control unit 108 causes the imaging control unit 103, the image input unit 104, the color conversion unit 105, and the measurement value correction unit 107 to execute measurement processing. That is, with processing (to be described alter), the imaging control unit 103 controls the capturing condition of the imaging apparatus 208, and captures the measurement patches under one or more capturing conditions (S305). The image input unit 104 acquires the capturing condition, receives the captured image, and stores the capturing condition and the captured image in association with each other in a predetermined area of the storage unit 203 (S306).

Upon completion of capturing the measurement patches, the color conversion unit 105 reads out the captured image and the capturing condition from the storage unit 203, and acquires a color conversion characteristic corresponding to the capturing condition (S307). Then, the measurement values of the measurement patches are calculated from the captured image corresponding to the capturing condition by a method (to be described later) (S308).

A color conversion characteristic is generated in advance by a method (to be described later) based on the correspondence between a spectral radiancemeter and a camera pixel value. FIG. 7 shows examples of color conversion characteristics stored in the color conversion characteristic storage unit 106. The color conversion characteristics indicate a table recording matrix coefficients corresponding to each combination (capturing condition) of an f-number, ISO sensitivity, and shutter speed for each camera model. Note that FIG. 7 shows an example in which nine matrix coefficients correspond to each capturing condition by assuming color conversion using a 3×3 matrix. A 3×4 matrix including constant terms or a matrix including squared terms or cubed terms can also be used for color conversion. Alternatively, a three-dimensional lookup table, gamma conversion, or the like may be used for color conversion.

By a method (to be described later), the measurement value correction unit 107 corrects the measurement values calculated by the color conversion unit 105 (S308), and generates a display profile and stores it in the storage unit 203 or the recording medium 210 (S309). After that, the process returns to step S303.

Imaging Control Unit

The imaging control unit 103 controls the capturing condition so as to acquire a captured image without any highlight-detail losses or shadow-detail losses for each measurement patch. That is, the imaging control unit 103 sets a start capturing condition with a reduced exposure amount which generates no highlight-detail losses for all the measurement patches. After that, a capturing operation starts under the start capturing condition, and a change of the capturing condition and a capturing operation are repeated until a captured image with no shadow-detail losses for all the measurement patches is acquired.

Figure 8:
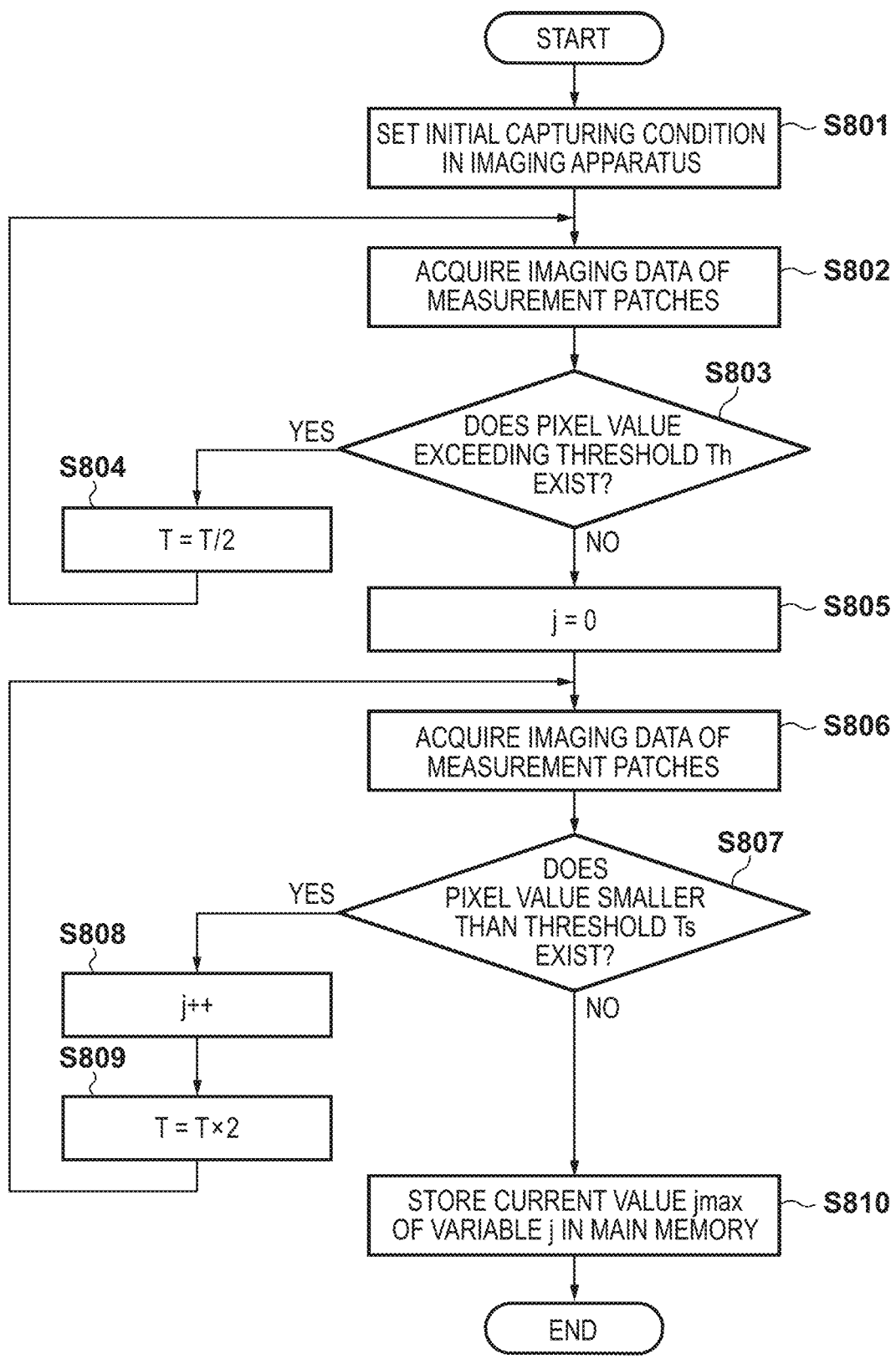
FIG. 8 is a flowchart for explaining processing by an imaging control unit.

The processing (S305) by the imaging control unit 103 will be described with reference to the flowchart of FIG. 8.

The imaging control unit 103 sets the initial capturing condition in the imaging apparatus 208 (S801), acquires, through the image input unit 104, imaging data obtained by capturing the measurement patches displayed on the screen using the imaging apparatus 208 (S802). Note that the initial capturing condition may be arbitrary. For example, a capturing condition under which the correct exposure of the brightness of the focus position (for example, the center of the screen) is obtained in an aperture priority mode is used. Assume that an f-number F, ISO sensitivity S, and shutter speed T are set as the capturing condition in the capturing operation in step S802.

The imaging control unit 103 compares each pixel value of the acquired imaging data with a predetermined threshold Th, and determines whether there exists a pixel value exceeding the threshold Th (S803). The threshold Th is a threshold for preventing highlight-detail losses, and is set to a value close to the upper limit of a range within which the linearity between the pixel value of imaging data output from the imaging apparatus 208 and the luminance value of an object is maintained. For example, if the imaging data is 8-bit RGB data, the threshold Th is set to 198 or the like. Note that as a pixel value to be compared with the threshold Th, the average value of the R, G, and B values of the pixel or all the R, G, and B components of the pixel value may be used. In the latter case, if at least one component exceeds the threshold Th, it is determined that there exists a pixel value exceeding the threshold Th.

If there exists a pixel value exceeding the threshold Th, the imaging control unit 103 changes the shutter speed (S804) by:

$$T=T/2 \quad (1)$$

The imaging control unit 103 then returns the process to step S801.

That is, to decrease the exposure amount of the imaging device of the imaging apparatus 208, the shutter opening period of the imaging apparatus 208 is set to ½ in step S804. Note that the start capturing condition may be searched for by increasing the f-number (for example, 2→2.8) and then decreasing the exposure amount, or by decreasing the ISO sensitivity (for example, 100→80) of the imaging device and then decreasing the pixel value. Note that if the shutter open period cannot be set to ½, the shutter speed need only be set higher by one step (for example, ⅟60 sec→⅟125 sec).

If there is no pixel value exceeding the threshold Th, the imaging control unit 103 sets the current capturing condition as the start capturing condition. The imaging control unit 103 sets 0 in a variable j representing a captured image number (S805), starts a capturing operation for measurement value calculation, and acquires, through the image input unit 104, imaging data obtained by capturing the measurement patches displayed on the screen using the imaging apparatus 208 (S806).

In step S806, the image input unit 104 stores the received jth imaging data and its capturing condition in association with each other in a predetermined area of the storage unit 203. Note that as the jth (=0) imaging data, imaging data captured in step S802 which is immediately precedingly performed may be used.

The imaging control unit 103 compares each pixel value of the jth imaging data with a predetermined threshold Ts, and determines whether there exists a pixel value smaller than the threshold Ts (S807). The threshold Ts is a threshold for preventing shadow-detail losses, and is set to a value close to the lower limit of the range within which the linearity between the pixel value of imaging data output from the imaging apparatus 208 and the luminance value of the object is maintained. For example, if the imaging data is 8-bit RGB data, the threshold Ts is set to 50 or the like. Note that as a pixel value to be compared with the threshold Ts, the average value of the R, G, and B values of the pixel is used.

If there exists a pixel value smaller than the threshold Ts, the imaging control unit 103 increments the variable j (S808), and changes the shutter speed (S809) by:

$$T=T\times 2 \quad (2)$$

The imaging control unit 103 then returns the process to step S806 to acquire imaging data under the changed capturing condition.

That is, to increase the exposure amount of the imaging device of the imaging apparatus 208, the shutter opening period of the imaging apparatus 208 is doubled in step S809. Note that the f-number may be decreased (for example, 4→2.8) and the exposure amount may then be increased. Alternatively, the ISO sensitivity of the imaging device may be increased (for example, 50→64) and the pixel value may then be increased. Note that if the shutter opening period cannot be doubled, the shutter speed need only be set lower by one step (for example, ⅟15 sec→⅛ sec).

If there is no pixel value smaller than the threshold Ts, the imaging control unit 103 stores the current value of the variable j as a capturing count jmax in a predetermined area of the main memory 202 (S810), and terminates the capturing operation for measurement value calculation. As described above, the imaging control unit 103 starts a capturing operation under the start capturing condition which generates no highlight-detail losses for all the measurement patches, and a change of the capturing condition and a capturing operation are repeated until a captured image with no shadow-detail losses for all the measurement patches is acquired.

Color Conversion Unit

Figure 9:
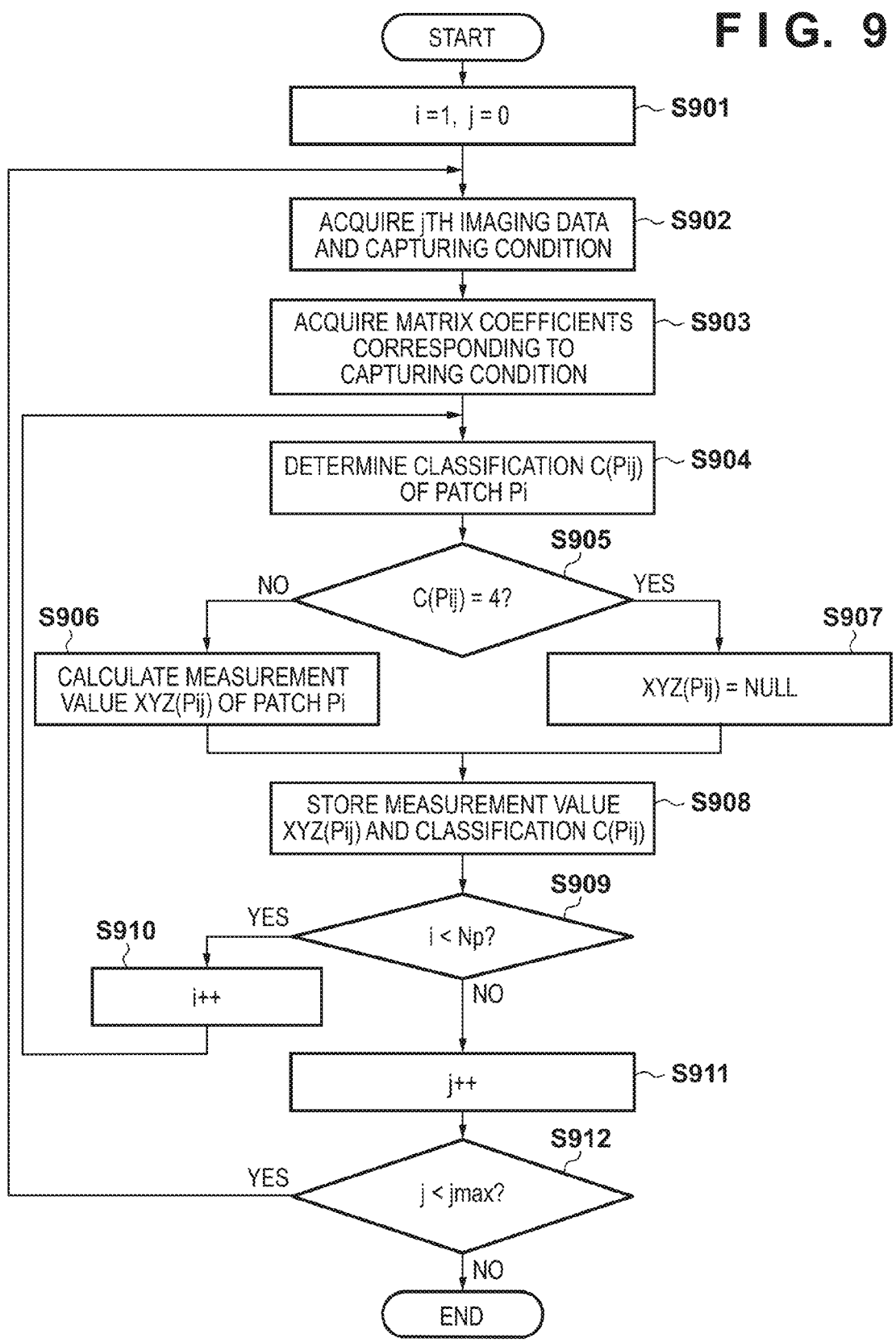
FIG. 9 is a flowchart for explaining processing by a color conversion unit.

The processing (S307 to S308) by the color conversion unit 105 will be described with reference to the flowchart of FIG. 9.

The color conversion unit 105 sets 1 in a variable i and 0 in the variable j (S901), and acquires the jth imaging data and its capturing condition from the storage unit 203 (S902). The color conversion unit 105 then acquires matrix coefficients $\alpha_{j0}$ to $\alpha_{j8}$ corresponding to the capturing condition from the color conversion characteristic storage unit 106 (S903).

Next, based on a pixel value included in the imaging data, the color conversion unit 105 determines a classification C(Pij) of an ith patch Pi (S904), as given by:

if $(T1 \leq RGBi < T2)$ $C(Pij)=1;$ if $(T2 \leq RGBi < T3)$ $C(Pij)=2;$ if $(T3 \leq RGBi < T4)$ $C(Pij)=3;$ else $C(Pij)=4;$     (3)

where RGBi represents the average value (Ri+Gi+Bi)/(3× 255) of the R, G, and B components of the patch Pi, and thresholds satisfy T1<T2<T3<T4 (for example, T1=Ts and T4=Th).

Figure 10:
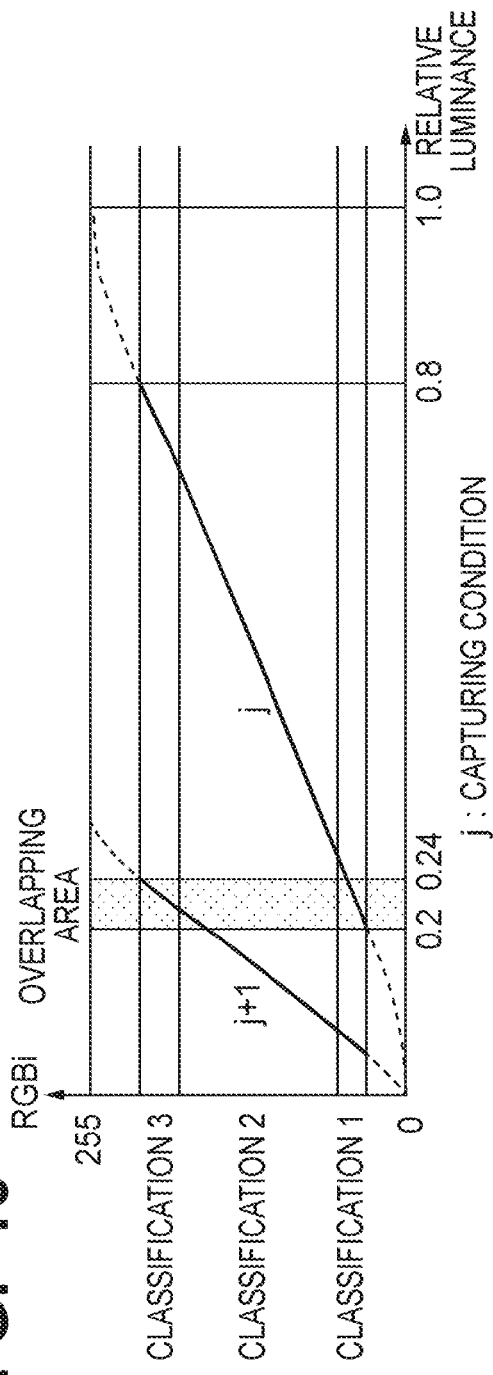
FIG. 10 is a graph showing an example of the relationship between a pixel value and classification and the relative luminance value of an object corresponding to a capturing condition.

FIG. 10 shows an example of the relationship between the pixel value RGBi and classification and the relative luminance value of the object under each capturing condition. Referring to FIG. 10, the ordinate represents the pixel value RGBi and the abscissa represents the relative luminance value. As indicated by solid lines in FIG. 10, the pixel value RGBi and the relative luminance value have the linear relationship in classifications 1 to 3. However, as indicated by broken lines in FIG. 10, the pixel value RGBi and the relative luminance value have no linear relationship in classification 4.

Figure 11:
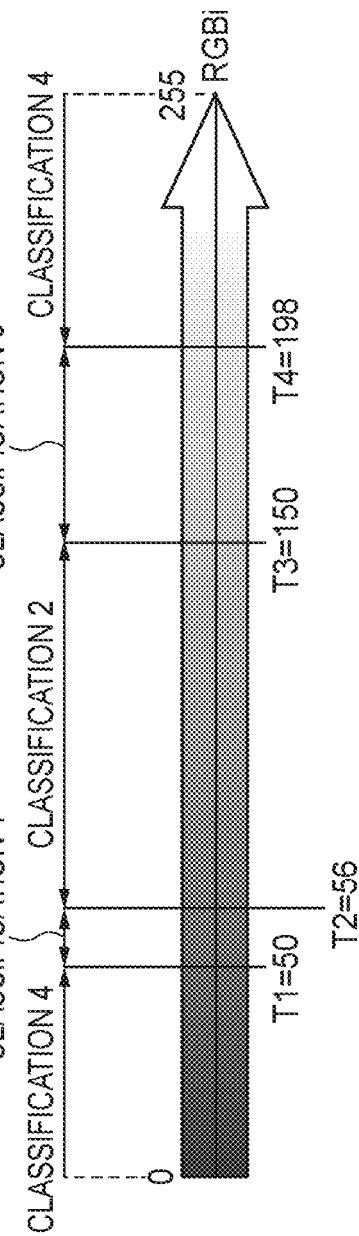
FIG. 11 is a view showing the relationship among the pixel values, thresholds, and classifications.

Referring to FIG. 10, a hatched area indicates an overlapping area between different capturing conditions, which corresponds to the same luminance range within which the luminance value and the pixel value have the linear relationship under the adjacent capturing conditions. That is, the thresholds T1 to T4 are set so that classifications 1 and 3 correspond to the overlapping area. FIG. 11 shows the relationship among the pixel values, thresholds, and classifications. Note that numerical values shown in FIGS. 10 and 11 are merely examples.

That is, the pixel values of each patch are classified into the first classification in which the pixel value falls within the range from the first threshold (inclusive) to the second threshold (exclusive), the second classification in which the pixel value falls within the range from the second threshold (inclusive) to the third threshold (exclusive), the third classification in which the pixel value falls within the range from the third threshold (inclusive) to the fourth threshold (exclusive), and the fourth classification in which the pixel value is smaller than the first threshold or equal to or larger than the fourth threshold.

The color conversion unit 105 determines whether C(Pij) is 4 (S905). If C(Pij)≠4, the color conversion unit 105 calculates the measurement value of the patch Pi (S906) by:

$$\begin{bmatrix} Xi \\ Yi \\ Zi \end{bmatrix} = \begin{bmatrix} \alpha_{j0} & \alpha_{j1} & \alpha_{j2} \\ \alpha_{j3} & \alpha_{j4} & \alpha_{j5} \\ \alpha_{j6} & \alpha_{j7} & \alpha_{j8} \end{bmatrix} \begin{bmatrix} Ri \\ Gi \\ Bi \end{bmatrix} \quad (4)$$

If C(Pi)=4, the color conversion unit 105 sets XYZ(Pij)=NULL without calculating the measurement value (S907). The color conversion unit 105 then stores the measurement value XYZ(Pij) and the classification C(Pij) as the determination result in a predetermined area of the storage unit 203 (S908). FIG. 12 shows an example of a measurement value storage table. The storage table stores a classification and measurement value associated with the image number j and the patch number i.

The color conversion unit 105 compares the value of the variable i with the patch count Np (S909). If the value of the variable i is smaller than the patch count Np (i<Np), the color conversion unit 105 increments the variable i (S910), and returns the process to step S904. When the value of the variable i reaches the patch count Np (i=Np), the color conversion unit 105 determines that the processing of the jth imaging data has ended, and increments the variable j (S911). The color conversion unit 105 compares the value of the variable j with the capturing count jmax (S912). If the value of variable j is smaller than the capturing count jmax (j<jmax), the color conversion unit 105 returns the process to step S902 to process unprocessed imaging data. When the value of the variable j reaches the capturing count jmax (j=jmax), the color conversion unit 105 determines that the processing of all the imaging data has ended, thereby terminating the process.

Measurement Value Correction Unit

Figure 13:
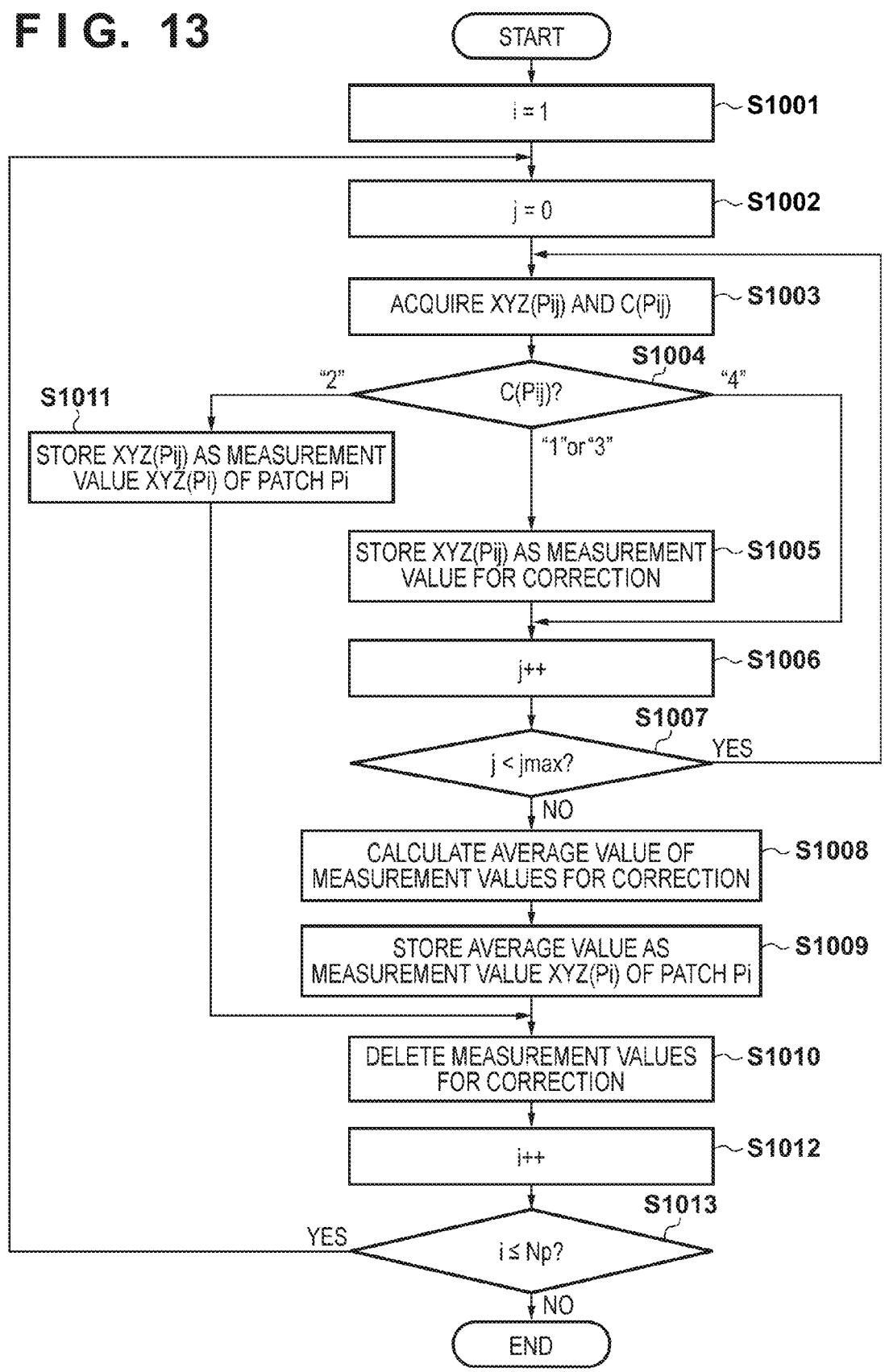
FIG. 13 is a flowchart for explaining correction processing by a measurement value correction unit.

The measurement value correction unit 107 corrects the calculated measurement values to reduce the discontinuity in the overlapping area between the adjacent capturing conditions. The correction processing (S309) by the measurement value correction unit 107 will be described with reference to the flowchart of FIG. 13.

The measurement value correction unit 107 sets 1 in the variable i (S1001), sets 0 in the variable j (S1002), and acquires the measurement value XYZ(Pij) and the classification C(Pij) of the patch Pi of the jth imaging data from the storage unit 203 (S1003).

The measurement value correction unit 107 determines the classification C(Pij) of the patch Pi (S1004). If C(Pij)=1 or C(Pij)=3, the measurement value correction unit 107 stores the measurement value XYZ(Pij) as a measurement value for correction in a predetermined area of the main memory 202 (S1005), and increments the variable j (S1006). If C(Pij)=4, the measurement value correction unit 107 increments the variable j (S1006).

The measurement value correction unit 107 compares the value of the variable j with the capturing count jmax (S1007). If the value of the variable j is smaller than the capturing count jmax (j>jmax), the measurement value correction unit 107 returns the process to step S1003. When the value of the variable j reaches the capturing count jmax (j=jamx), the measurement value correction unit 107 calculates the average value of the measurement values for correction (S1008). The measurement value correction unit 107 then stores the average value as the measurement value XYZ(Pi) of the patch Pi in a predetermined area of the storage unit 203 (S1009), deletes the measurement values for correction (S1010), and advances the process to step S1012.

If C(Pij)=2, the measurement value correction unit 107 stores the measurement value XYZ(Pij) as the measurement value XYZ(Pi) of the patch Pi in a predetermined area of the storage unit 203 (S1011), deletes the measurement values for correction (S1010), and advances the process to step S1012. Note that the processing in step S1010 when C(Pij)=2 is to delete the measurement values for correction, which are stored in the main memory 202 before C(Pij)=2 appears.

The measurement value correction unit 107 increments the variable i (S1012), and compares the value of the variable i with the patch count Np (S1013). If the value of the variable i is equal to or smaller than the patch count Np (i≤Np), the measurement value correction unit 107 returns the process to step S1002. If the value of the variable i exceeds the patch count Np (i>Np), the measurement value correction unit 107 determines that correction of the measurement values of all the measurement patches has ended, thereby terminating the correction processing. Note that if the measurement count is one, the measurement value correction processing may be skipped.

As described above, the measurement value of a measurement patch is accurately calculated based on a color conversion characteristic corresponding to the capturing condition of imaging data. Furthermore, for a measurement value in the overlapping area between different capturing conditions, a corrected measurement value is calculated based on the measurement value. Therefore, by using an imaging apparatus such as a digital camera, it is possible to acquire a high-accuracy measurement value for a measurement patch while the discontinuity between imaging data obtained under different capturing conditions is reduced.

Second Embodiment

Image processing according to the second embodiment of the present invention will be described below. Note that the same reference numerals as those in the first embodiment denote the same components in the second embodiment and a detailed description thereof will be omitted.

In the first embodiment, a method of averaging the measurement values calculated from the pixel values in the overlapping area under the adjacent capturing conditions has been exemplified as a measurement value correction method. If, however, there is a large difference between the measurement values in the overlapping area, the method of the first embodiment may insufficiently improve the discontinuity. In the second embodiment, a correction method which sufficiently improves the discontinuity even if there is a large difference between measurement values in an overlapping area will be described.

Figure 14:
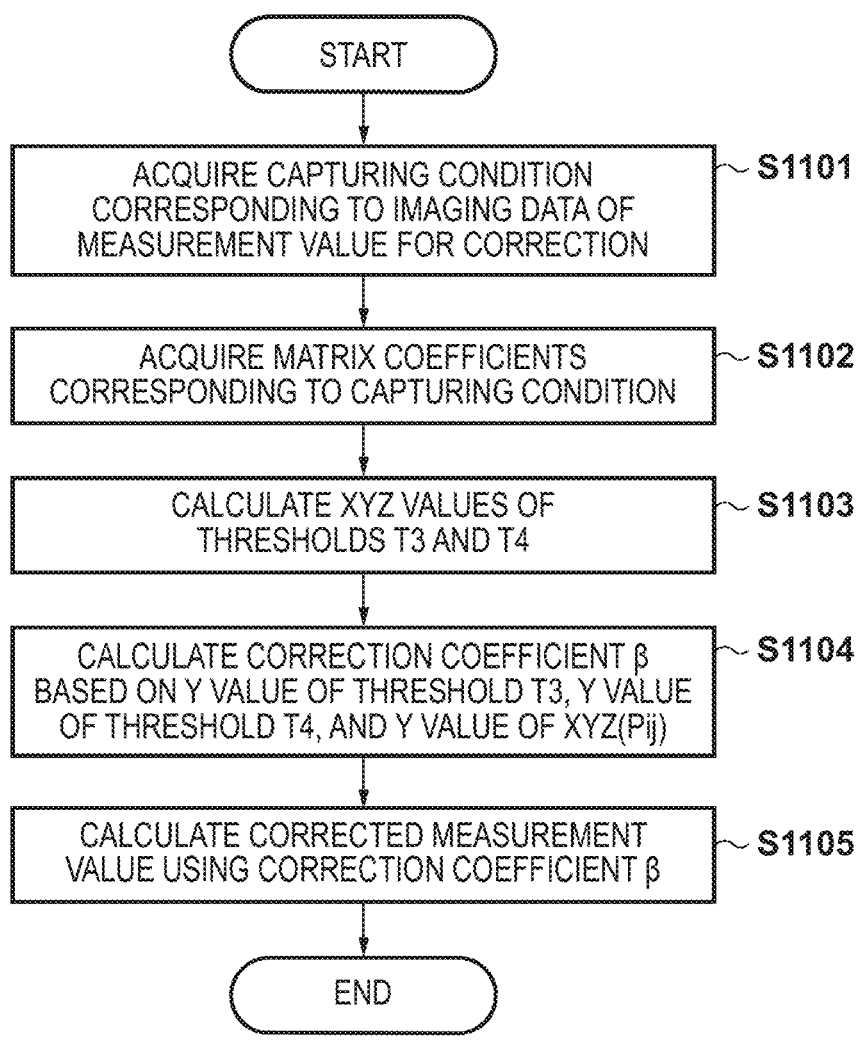
FIG. 14 is a flowchart for explaining corrected measurement value calculation processing by a measurement value correction unit according to the second embodiment.

Corrected measurement value calculation processing by a measurement value correction unit 107 according to the second embodiment will be explained with reference to the flowchart of FIG. 14. Note that processing shown in FIG. 14 is replaced by the processing in step S1008 shown in FIG. 13.

The measurement value correction unit 107 acquires a capturing condition corresponding to imaging data of a measurement value for correction (S1101), and acquires matrix coefficients corresponding to the capturing condition from a color conversion characteristic storage unit 106 (S1102). If, for example, imaging data of measurement values for correction are the (j−1)th and jth imaging data, the measurement value correction unit 107 acquires matrix coefficients $\alpha_{j0}$ to $\alpha_{j8}$ corresponding to the capturing condition of the jth imaging data.

The measurement value correction unit 107 calculates the XYZ values of the RGB values (for example, (150, 150, 150)) of a threshold T3 and the XYZ values of the RGB values (for example, (198, 198, 198)) of a threshold T4 (S1103). Then, the measurement value correction unit 107 calculates a correction coefficient β (S1104) by:

$$\beta = (Yj_{T4} - Yj)/(Yj_{T4} - Yj_{T3}) \quad (5)$$

where $Yj_{T3}$ represents the Y value of the threshold T3, $Yj_{T4}$ represents the Y value of the threshold T4, and Yj represents the Y value of XYZ(Pij).

The measurement value correction unit 107 calculates a corrected measurement value using the correction coefficient β (S1105) by:

$$\begin{bmatrix} X(Pi) \\ Y(Pi) \\ Z(Pi) \end{bmatrix} = \beta \begin{bmatrix} Xj \\ Yi \\ Zi \end{bmatrix} + (1-\beta) \begin{bmatrix} Xj-1 \\ Yj-1 \\ Zj-1 \end{bmatrix} \quad (6)$$

where Xj, Yj, and Zj respectively represent the X, Y, and Z values of XYZ(Pij), and
Xj−1, Yj−1, and Zj−1 respectively represent the X, Y, and Z values of XYZ(Pij−1).

That is, a weighted average is used for correction between the measurement values of imaging data obtained under different capturing conditions. This can improve the improvement factor of the discontinuity when the difference between the measurement values calculated from the imaging data obtained under the different capturing conditions is large.

Modification of Embodiments

The example has been described above in which a linear function such as an average value or weighted average is used as a composition ratio for correction between the measurement values obtained under the different capturing conditions. A composition ratio may be nonlinear.

In the above-described example, the correction coefficient β is calculated based on the distance relationship between the Y value of a threshold calculated using matrix coefficients corresponding to a capturing condition with a larger exposure amount among two capturing conditions and the Y value of a measurement value corresponding to the capturing condition with the larger exposure amount. The correction coefficient β, however, may be calculated based on the distance relationship between the Y value of a threshold calculated using matrix coefficients corresponding to a capturing condition with a smaller exposure amount and the Y value of a measurement value corresponding to the capturing condition with the smaller exposure amount.

Furthermore, in the above-described example, a color value in the CIEXYZ space is calculated as a measurement value based on RGB values output from the imaging apparatus by using matrix calculation. However, for example, a color value in the CIELAB space, CIELUV space, CIECAM97s space, or CIECAM02 space may be calculated as a measurement value based on RGB values by combining gamma correction and matrix calculation.

In the above example, the application of generating a display profile has been exemplified. However, for example, the present invention may be incorporated in the device as a calibration function. The present invention is applicable to, for example, the calibration function of a monitor serving as an output device.

In addition, in the above example, the exposure amount is controlled and the pixel values are classified by comparing each pixel value obtained by simply averaging the R, G, and B components with various thresholds. However, a pixel value obtained by giving a weight to R, G, and B components and averaging them or a pixel value calculated by a predetermined function f(R, G, B) may be used for comparison.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-045562 filed Mar. 7, 2014, which is hereby incorporated by reference herein in its entirety.

What is claimed is:

1. A color processing apparatus comprising:
    a control unit configured to control capturing conditions and capturing of an imaging apparatus which captures a plurality of color patches displayed on a monitor;
    an input unit configured to input imaging data from the imaging apparatus; and
    a calculation unit configured to calculate measurement values of the plurality of color patches from the imaging data using color conversion characteristics corresponding to the capturing conditions, wherein the calculation unit classifies a pixel value of each color patch indicated by the imaging data into one of first to fourth classifications, calculates the measurement values from the pixel values of the first to third classifications, and no measurement value is calculated from the pixel values of the fourth classification,
    wherein the first classification is equal to or greater than a first threshold value and less than a second threshold value, the second classification is equal to or greater than the second threshold value and less than a third threshold value, the third classification is equal to or greater than the third threshold value and less than a fourth threshold value, and the fourth classification is less than the first threshold value or equal to or greater than the fourth threshold value,
    wherein the control unit sets first capturing conditions used at start of the capturing for the calculation of measurement values based on the imaging data captured by the imaging apparatus using initial capturing conditions, and
    after the capturing for the calculation of measurement values is started, when the imaging data is input, the control unit determines whether or not perform the capturing by changing the capturing conditions.

2. The color processing apparatus according to claim 1, wherein the capturing conditions comprise a combination of an f-number, ISO sensitivity, and shutter speed for each model of the imaging apparatus.

3. The color processing apparatus according to claim 1, further comprising a correction unit configured to calculate a corrected measurement value in a case where there are plural measurement values, which are calculated from a plurality of the imaging data that the capturing conditions are different, for each color patch, wherein the corrected measurement value of the color patch is calculated from the plural measurement values of the color patch.

4. The color processing apparatus according to claim 3, wherein the correction unit calculates the corrected measurement value from the measurement values which are calculated from the pixel values of the first or third classification.

5. The color processing apparatus according to claim 4, wherein the correction unit calculates color values corresponding to the third and fourth threshold values using the color conversion characteristics which corresponds to the capturing conditions of the imaging data corresponding to the measurement values calculated from the pixel values of the third classification, and calculates a correction coefficient used in the calculation of the corrected measurement value using the measurement values and the color values.

6. The color processing apparatus according to claim 1, wherein the first and third classifications correspond to a luminance range in which luminance values of an object and pixel values of the imaging data indicate a linear relationship in different capturing conditions.

7. The color processing apparatus according to claim 1, wherein the imaging apparatus comprises a digital camera.

8. A color processing method comprising:
    using a processor to perform steps of:
    controlling capturing conditions and capturing of an imaging apparatus which captures a plurality of color patches displayed on a monitor;
    inputting imaging data from the imaging apparatus;
    calculating measurement values of the plurality of color patches from the imaging data using color conversion characteristics corresponding to the capturing conditions;
    setting first capturing conditions used at start of the capturing for the calculation of measurement values based on the imaging data captured by the imaging apparatus using initial capturing conditions; and
    determining, after the capturing for the calculation of measurement values is started, when the imaging data is input, whether or not perform the capturing by changing the capturing conditions,
    wherein in said calculating, a pixel value of each color patch indicated by the imaging data is classified into one of first to fourth classifications, the measurement values from the pixel values is calculated for the first to third classifications, and no measurement value is calculated from the pixel values of the fourth classification, and
    wherein the first classification is equal to or greater than a first threshold value and less than a second threshold value, the second classification is equal to or greater than the second threshold value and less than a third threshold value, the third classification is equal to or greater than the third threshold value and less than a fourth threshold value, and the fourth classification is less than the first threshold value or equal to or greater than the fourth threshold value.

9. A non-transitory computer readable medium storing a computer-executable program for causing a computer to perform a color processing method, the method comprising steps of:

controlling capturing conditions and capturing of an imaging apparatus which captures a plurality of color patches displayed on a monitor;

inputting imaging data from the imaging apparatus;

calculating measurement values of the plurality of color patches from the imaging data using color conversion characteristics corresponding to the capturing conditions, wherein in said calculating, a pixel value of each color patch indicated by the imaging data is classified into one of first to fourth classifications, the measurement values from the pixel values is calculated for the first to third classifications, and no measurement value is calculated from the pixel values of the fourth classification, and wherein the first classification is equal to or greater than a first threshold value and less than a second threshold value, the second classification is equal to or greater than the second threshold value and less than a third threshold value, the third classification is equal to or greater than the third threshold value and less than a fourth threshold value, and the fourth classification is less than the first threshold value or equal to or greater than the fourth threshold value;

the method further comprising:

setting first capturing conditions used at start of the capturing for the calculation of measurement values based on the imaging data captured by the imaging apparatus using initial capturing conditions; and determining, after the capturing for the calculation of measurement values is started, when the imaging data is input, whether or not perform the capturing by changing the capturing conditions.

* * * * *